「United States Patent」 [Shibata et al.]

(10) Patent No.: US 9,779,488 B2
(45) Date of Patent: Oct. 3, 2017

(54) INFORMATION PROCESSING DEVICE, IMAGE PROCESSING METHOD AND MEDIUM

(71) Applicant: NEC Corporation, Minato-ku, Tokyo (JP)

(72) Inventors: Takashi Shibata, Tokyo (JP); Akihiko Iketani, Tokyo (JP); Shuji Senda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/779,147

(22) PCT Filed: Mar. 25, 2014

(86) PCT No.: PCT/JP2014/001704
§ 371 (c)(1),
(2) Date: Sep. 22, 2015

(87) PCT Pub. No.: WO2014/162690
PCT Pub. Date: Oct. 9, 2014

(65) Prior Publication Data
US 2016/0055627 A1 Feb. 25, 2016

(30) Foreign Application Priority Data
Apr. 5, 2013 (JP) .................. 2013-079338

(51) Int. Cl.
G06K 9/40 (2006.01)
G06T 5/00 (2006.01)
(Continued)

(52) U.S. Cl.
CPC ............ *G06T 5/003* (2013.01); *G06K 9/6255* (2013.01); *G06K 9/6256* (2013.01);
(Continued)

(58) Field of Classification Search
CPC .. G06K 9/6255; G06K 9/6256; G06T 3/4053; G06T 3/4076; G06T 5/003; G06T 7/0024; H04N 1/3871
(Continued)

(56) References Cited

U.S. PATENT DOCUMENTS 8,406,571 B2 * 3/2013 Weinberger ............... G06K 9/32
382/274
8,411,980 B1 * 4/2013 Wang ....................... G06T 5/003
248/581
(Continued)

FOREIGN PATENT DOCUMENTS

JP 2008-299618 A 12/2008
JP 2009-181508 A 8/2009
(Continued)

OTHER PUBLICATIONS

A. Buades, B. Coll, and J-M. Morel, "A non-local algorithm for image denoising", IEEE Computer Society Conference on Computer Vision and Pattern Recognition 2005 (CVPR2005), vol. 2, pp. 60-65, Jun. 20-25, 2005. English Abstract.
(Continued)

*Primary Examiner* — Mek Onen Bekele

(57) ABSTRACT

An information processing device according to the present invention includes: a proper identifier output unit which outputs proper identifiers for identifying learning images; a feature vector calculation unit which calculates feature vectors of at least a part of patches included in registered patches that are registered in a dictionary for compositing a restored image; and a search similarity calculation unit which calculates a similarity calculation method that classifies the proper identifiers to be given to the registered patches based on the feature vectors.

22 Claims, 12 Drawing Sheets

(51) Int. Cl.
   *H04N 1/387*     (2006.01)
   *G06T 3/40*      (2006.01)
   *G06K 9/62*      (2006.01)

(52) U.S. Cl.
   CPC .......... *G06T 3/4053* (2013.01); *G06T 3/4076* (2013.01); *H04N 1/3871* (2013.01)

(58) Field of Classification Search
   USPC .................. 382/100, 190, 254, 299, 274
   See application file for complete search history.

(56) References Cited

U.S. PATENT DOCUMENTS

| | | | | |
|---|---|---|---|---|
| 8,675,974 | B2* | 3/2014 | Iio | G06K 9/4642 |
| | | | | 382/190 |
| 9,436,981 | B2* | 9/2016 | Shibata | G06N 99/005 |
| 2008/0219493 | A1* | 9/2008 | Tadmor | G06T 1/00 |
| | | | | 382/100 |
| 2009/0018990 | A1* | 1/2009 | Moraleda | G06K 9/00463 |
| 2009/0080711 | A1* | 3/2009 | Yokoi | G06K 9/00362 |
| | | | | 382/116 |
| 2011/0158535 | A1* | 6/2011 | Iio | G06K 9/4642 |
| | | | | 382/190 |
| 2012/0321175 | A1* | 12/2012 | Hedau | G06K 9/6227 |
| | | | | 382/159 |
| 2014/0321738 | A1* | 10/2014 | Shibata | G06N 99/005 |
| | | | | 382/160 |
| 2015/0146994 | A1* | 5/2015 | Arnison | G06T 7/0069 |
| | | | | 382/254 |

FOREIGN PATENT DOCUMENTS

| | | |
|---|---|---|
| JP | 2011-170456 A | 9/2011 |
| JP | 2012-043437 A | 3/2012 |

OTHER PUBLICATIONS

Shuji Senda et al., "Example-based Super Resolution to Achieve Fine Magnification of Low-Resolution Images", NEC Technical Journal, Sep. 1, 2012 (Sep. 1, 2012), vol. 65, No. 2, pp. 73 to 76. Cited in ISR as "Big Data Shori o Sasaeru Senshin Gijutsu Kobairitu Koseisai o Jitsugen suru Jirei Base no Gakushugata Cho Kaizo Hoshiki".

International Search Report for PCT Application No. PCT/JP2014/001704, mailed on Jul. 1, 2014.

English translation of Written opinion for PCT Application No. PCT/JP2014/001704.

* cited by examiner

INFORMATION PROCESSING DEVICE, IMAGE PROCESSING METHOD AND MEDIUM

CROSS-REFERENCE TO RELATED APPLICATIONS

This is a national stage of International Application No. PCT/JP2014/001704 filed Mar. 25, 2014, claiming priority based on Japanese Patent Application No. 2013-079338 filed Apr. 5, 2013, the entire contents of which are incorporated herein by reference.

TECHNICAL FIELD

The present invention relates to an image information processing technology, and more particularly to restoration processing of blurred images.

BACKGROUND ART

Image processing technologies to process digital image data have been widely known. As one of those image processing technologies, a blur restoration technology has been known. The blur restoration technology is a technology to restore blurred images.

The blur restoration technologies include, for example, a noise removal technology (denoise), a haze removal technology (dehaze), and a super resolution technology (super-resolution) (for example, refer to NPL 1). The super resolution technology will be described below as an example of the blur restoration technologies.

The super resolution technology is an image processing technology to raise the resolution of image data. The super resolution technologies include, for example, the following two technologies.

The first super resolution technology is a multiple-frame super resolution technology. The multiple-frame super resolution technology is a technology to generate a piece of high resolution image data by using a plurality of pieces of image data (a plurality of frames) that composes a motion video or are generated by consecutive shooting (for example, refer to PLT 1). As described above, the multiple-frame super resolution technology requires a plurality of pieces of image data to achieve high resolution. Thus, the multiple-frame super resolution technology is incapable of generating a piece of high resolution image data from a piece of image data.

The second super resolution technology is a learning based super resolution technology. The learning based super resolution technology is a technology to create a dictionary based on learning processing in advance and raise the resolution of a piece of image data by using the dictionary (for example, refer to PLTs 2 and 3). Since the learning based super resolution technology uses a dictionary, the learning based super resolution technology is capable of achieving a higher super resolution than the multiple-frame super resolution technology that uses a smaller number of pieces of referenced image data.

The learning based super resolution technology will be further described with reference to the drawings. The learning based super resolution technology includes "a learning phase" and "a super resolution phase" in general. "The learning phase" is a phase in which a dictionary that is used for super resolution processing is created. "The super resolution phase" is a phase in which a high resolution image is generated from a low resolution image by using the dictionary.

In the learning based super resolution technology, a device may carry out both phases. Alternatively, a plurality of devices may carry out the respective phases individually.

To make the description clearer, description using devices for the respective phases will be made below.

FIG. 10 is a diagram illustrating an example of a configuration of a super resolution system 900 that is related to the present invention.

The super resolution system 900 includes a dictionary creation device 910, a dictionary 920, and a super resolution image generation device 930.

The dictionary creation device 910 carries out a learning phase. Specifically, the dictionary creation device 910 creates patches (patch pairs 531), which are used in a super resolution phase, based on learning images 51, and stores the created patch pairs 531 in the dictionary 920.

The dictionary 920 stores the patch pairs 531 which the dictionary creation device 910 creates for the creation of a super resolution image.

The super resolution image generation device 930 carries out the super resolution phase. Specifically, the super resolution image generation device 930 generates a restored image 55 (a high resolution image) by using an input image 54 (a low resolution image) and the patch pairs 531, which are stored in the dictionary 920.

The respective phases will be further described.

FIG. 11 is a diagram for a description of the learning phase. Processing in the learning phase will be described by using FIGS. 10 and 11 in combination.

The dictionary creation device 910 receives high resolution images for learning (the learning images 51). The dictionary creation device 910 generates low resolution images (blurred images 52) by lowering the resolution of the learning images 51.

The dictionary creation device 910 cuts out image portions within predetermined ranges (high resolution patches 511) from the learning images 51. Further, the dictionary creation device 910 cuts out image portions (low resolution patches 521), that correspond to the cut-out high resolution patches 511, from the blurred images 52.

The dictionary creation device 910 generates patch pairs 531 by combining the high resolution patches 511 with the low resolution patches 521. The dictionary creation device 910 stores the patch pairs 531 in the dictionary 920.

FIG. 12 is a diagram for a description of the super resolution phase.

The super resolution image generation device 930 receives the input image 54.

Based on the input image 54, the super resolution image generation device 930 generates patches (input patches 541) to be compared with the low resolution patches 521 in the patch pairs 531.

Based on the generated input patches 541, the super resolution image generation device 930 selects patch pairs 531 by referring to the dictionary 920. More specifically, the super resolution image generation device 930 operates, for example, in the following manner.

The super resolution image generation device 930 calculates similarities between the input patch 541 and the low resolution patches 521 in all patch pairs 531. Based on the similarities, the super resolution image generation device 930 selects a patch pair 531 that includes the most similar low resolution patch 521. The high resolution patch 511 of the selected patch pair 531 becomes a patch (a restoration patch 551) that is used for compositing.

The super resolution image generation device 930 selects patch pairs 531 that correspond to all input patches 541. By using high resolution patches 511 in the selected patch pairs 531 as restoration patches 551, the super resolution image generation device 930 generates a restored image 55 (a super resolution image).

CITATION LIST

Patent Literature

[PLT 1] Japanese Unexamined Patent Application Publication No. 2009-181508
[PLT 2] Japanese Unexamined Patent Application Publication No. 2011-170456
[PLT 3] Japanese Unexamined Patent Application Publication No. 2012-043437

Non Patent Literature

[NPL 1] A. Buades, B. Coll, and J.-M. Morel, "A non-local algorithm for image denoising", IEEE Computer Society Conference on Computer Vision and Pattern Recognition 2005 (CVPR2005), Volume: 2, Page(s) 60-65, Jun. 20-25, 2005.

SUMMARY OF INVENTION

Technical Problem

The learning images 51 include a lot of types of images. Therefore, the learning images 51 include the same type of images as the input image 54 and different types of images from the input image 54. In other words, the patch pairs 531 that the dictionary 920 holds are created from a lot of types of learning images 51.

The super resolution technologies disclosed in the above-described PLTs 1 to 3, which are related to the present invention, compare similarities between the input patch 541 and all patch pairs 531 in the super resolution phase without discriminating patch pairs 531. Thus, there is a case in which the super resolution technologies disclosed in PLTs 1 to 3 select a patch pair 531 of an image of a different type from the input image 54.

As described above, there has been a problem in that the super resolution technologies disclosed in PLTs 1 to 3 are incapable of selecting an appropriate patch pair 531.

Since a technology disclosed in NPL 1 does not use a dictionary, the technology is incapable of dealing with the above-described problem.

An object of the present invention is to solve the above-described problem and provide an information processing device and an image processing method that make it possible to restore blurred images appropriately.

Solution to Problem

An information processing device according to an aspect of the present invention, includes: a proper identifier output unit which outputs proper identifiers for identifying learning images; a feature vector calculation unit which calculates feature vectors of at least a part of patches included in registered patches that are registered in a dictionary for compositing a restored image; and a search similarity calculation unit which calculates a similarity calculation method that classifies the proper identifiers to be given to the registered patches based on the feature vectors.

An image processing method according an aspect of the present invention, includes: outputting proper identifiers for identifying learning images; calculating feature vectors of at least a part of patches included in registered patches that are registered in a dictionary for compositing a restored image; and calculating a similarity calculation method that classifies the proper identifiers to be given to the registered patches based on the feature vectors.

A computer-readable recording medium according to an aspect of the present invention, the medium embodying a program, the program causing a computer device to perform a method, the method comprising: outputting proper identifiers for identifying learning images; calculating feature vectors of at least a part of patches included in registered patches that are registered in a dictionary for compositing a restored image; and calculating a similarity calculation method that classifies the proper identifiers to be given to the registered patches based on the feature vectors.

Advantageous Effects of Invention

With the present invention, it is possible to restore blurred images appropriately.

DESCRIPTION OF EMBODIMENTS

Figure 1:
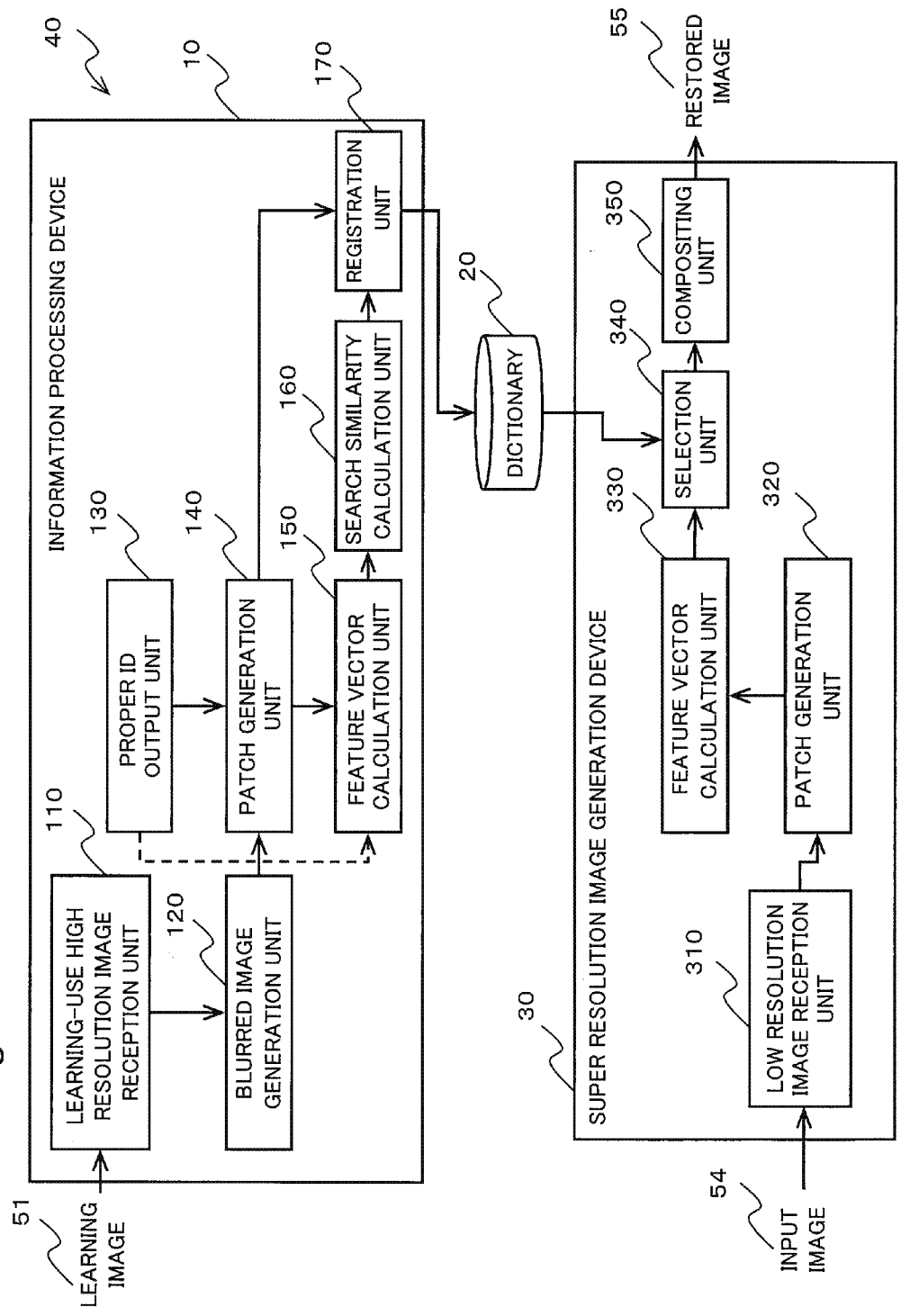
FIG. 1 is a block diagram illustrating an example of a configuration of a super resolution system that includes an information processing device according to a first exemplary embodiment of the present invention.

Next, exemplary embodiments of the present invention will be described with reference to the drawings.

The respective drawings are for a description of the exemplary embodiments of the present invention. Thus, the present invention is not limited to the illustrations in the respective drawings.

The same components in the respective drawings will be denoted by the same reference numerals and a repetitive description thereof may be omitted.

(First Exemplary Embodiment)

First, an information processing device 10 of a first exemplary embodiment, which is an exemplary embodiment of the present invention, will be described.

There is no limitation to a blur restoration technology that is applied to the information processing device 10 of the exemplary embodiment. Thus, the following description will be made by using a super resolution technology as an illustrative example.

FIG. 1 is a block diagram illustrating an example of a configuration of a super resolution system 40 that includes the information processing device 10 according to the first exemplary embodiment of the present invention.

The super resolution system 40 includes the information processing device 10, a dictionary 20, and a super resolution image generation device 30.

The information processing device 10 in the exemplary embodiment carries out a learning phase in super resolution processing.

For that purpose, the information processing device 10 includes a learning-use high resolution image reception unit 110, a blurred image generation unit 120, a proper ID (Identifier) output unit 130, a patch generation unit 140, a feature vector calculation unit 150, a search similarity calculation unit 160, and a registration unit 170.

Figure 2:
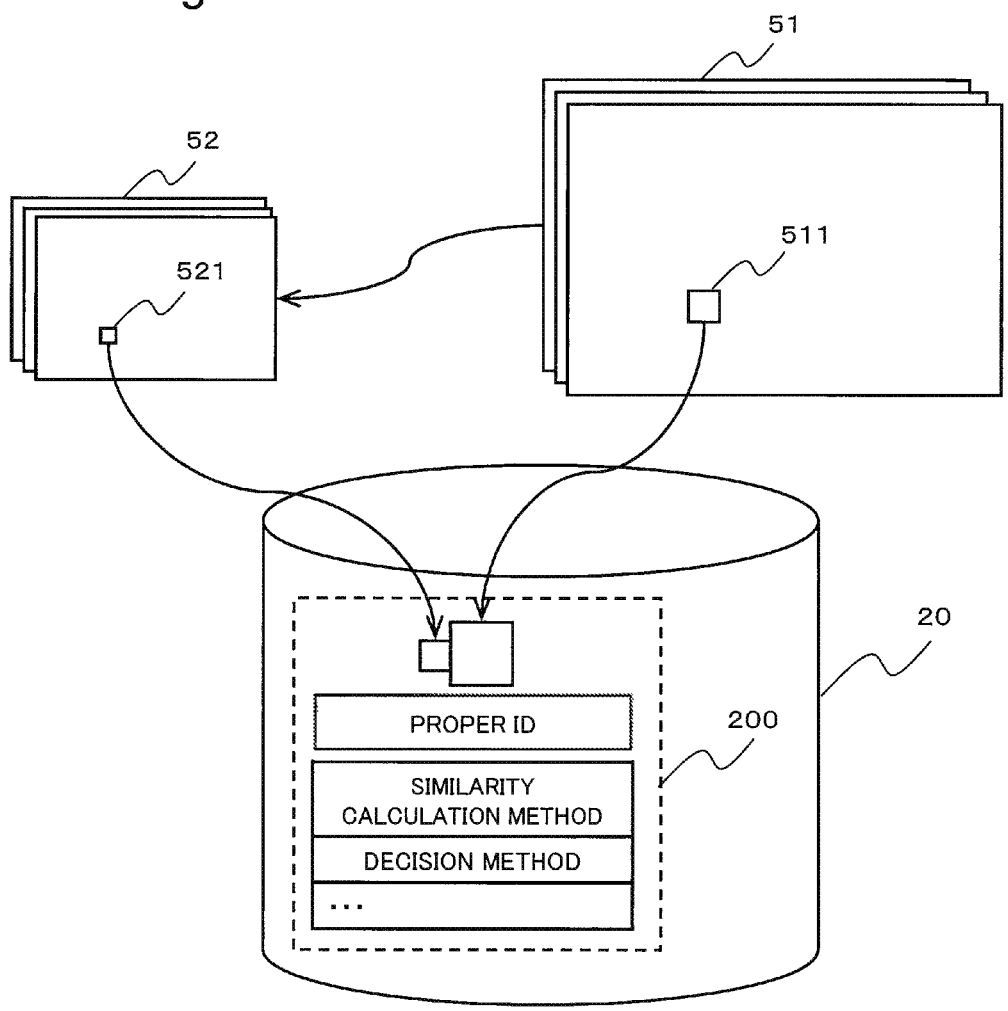
FIG. 2 is a diagram illustrating an example of data that the information processing device of the first exemplary embodiment registers in a dictionary.

FIG. 2 is a diagram illustrating an example of data that the information processing device 10 of the exemplary embodiment registers (stores) in the dictionary 20.

Figure 11:
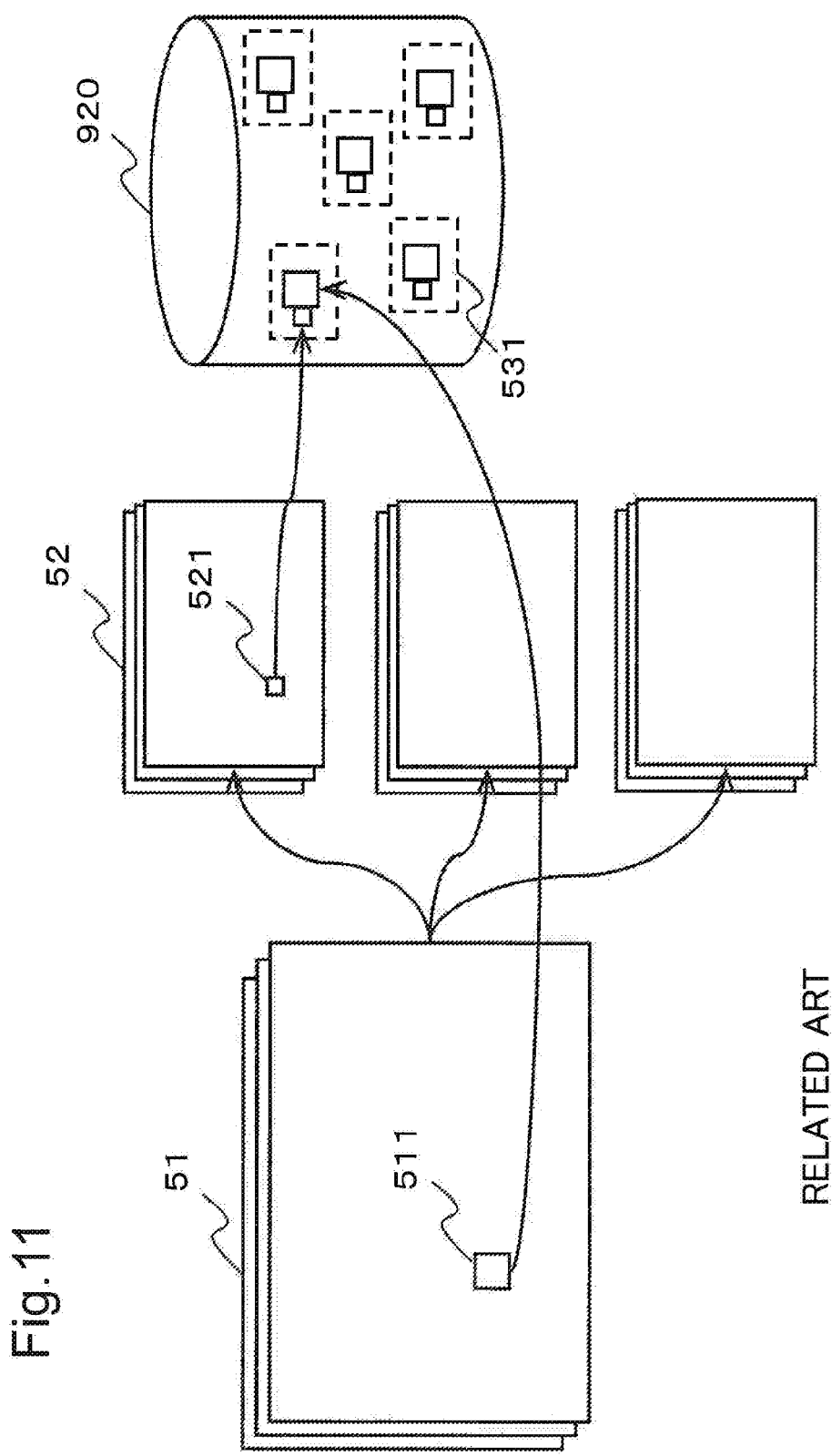
FIG. 11 is a diagram for a description of a learning phase that is related to the present invention.

The description below will also be made with reference to FIG. 2. In FIG. 2, the same reference numerals are assigned to the same components as in FIG. 11. In the following description, "registering (storing) data in the dictionary 20" is referred to as "creating the dictionary 20".

The learning-use high resolution image reception unit 110 receives high resolution images for use in learning (learning images 51 illustrated in FIG. 2) to create the dictionary 20. There is no particular limitation to a reception method of the learning images 51. For example, an operator of the super resolution system 40 may input the learning images 51 to the information processing device 10. The information processing device 10 may receive information that specifies a storage place of the learning images 51 from a not-illustrated input device of the super resolution system 40, and receive the learning images 51 from the specified storage place.

The blurred image generation unit 120 generates low resolution images (blurred images 52 illustrated in FIG. 2), which are generated by lowering the resolutions of the learning images 51. The blurred image generation unit 120 may generate a plurality of blurred images 52 by using a plurality of blurring methods.

The proper ID output unit 130 outputs identifiers (hereinafter, referred to as "proper identifiers" or "proper IDs (Identifiers)") that are assigned to registered patches 200, which the information processing device 10 registers in the dictionary 20 as will be described later. In other words, the proper ID output unit 130 is a proper identifier output unit. The proper ID output unit 130 may acquire proper IDs based on some method and output the acquired proper IDs, as will be described later. In other words, the proper ID output unit 130 may also be a proper identifier acquisition unit.

The following description will be made under the assumption that "the proper ID" is an identifier that is assigned to a learning image 51. However, the proper ID does not have to be an ID that is assigned to each learning image 51. The proper ID output unit 130 may, for example, acquire, as a proper ID, an ID that is assigned to each predetermined region in the learning image 51 and output the acquired ID. Alternatively, the proper ID output unit 130 may acquire, as a proper ID, an ID that is assigned to each registered patch 200 and output the acquired ID.

There is no particular limitation to the value and data form of a proper ID. For example, in the cases of a portrait image and a facial image, the proper ID may be an identifier (ID) of a person in the image.

Alternatively, the proper ID may be assigned in accordance with the type of an image. For example, the proper ID may be an identifier by which the type of a portion of a portrait image (for example, a facial image or an upper body image) can be classified. The proper ID may also be an identifier that enables to classify within the same type with respect to each type of a portion of a portrait image.

When images include predetermined numerical values (for example, a license plate image), the proper IDs may be numbers included in the images.

There is no particular limitation to the acquisition method of the proper ID. For example, the information processing device 10 may acquire proper IDs corresponding to the learning images 51 based on an input operation carried out by an operator. Alternatively, the proper ID output unit 130 may assign proper IDs to the learning images 51 sequentially.

The patch generation unit 140 generates (extracts) patches (for example, high resolution patches 511 and low resolution patches 521 in FIG. 2) that are included in registered patches 200 to be registered in the dictionary 20, based on the learning images 51 and blurred images 52 that the blurred image generation unit 120 has generated.

The dictionary 20 has no limitation to the storage method of patches. The information processing device 10 stores not only the high resolution patches 511 and the low resolution patches 521 but also other information as information that is stored in the dictionary 20, as will be described later. Thus, a set of information that is stored in the dictionary 20, including a plurality of patches (for example, a patch pair) and information other than the patches, is referred to as "registered patch 200" in the following description.

Further, the patch generation unit 140 assigns "proper IDs", which are received from the proper ID output unit 130, to the registered patches 200 including generated patches. As described above, the proper ID that is used in the description of the exemplary embodiment is an identifier that is assigned to each learning image 51. In other words, the proper ID output unit 130 assigns "the proper ID" of a learning image 51 to registered patches 200.

The feature vector calculation unit 150 receives the low resolution patches 521, which are included in the registered patches 200, from the patch generation unit 140. Further, the feature vector calculation unit 150 calculates "feature vectors" of the low resolution patches 521, which are included in the registered patches 200. In other words, the feature vector calculation unit 150 calculates feature vectors by using at least a part of patches among the registered patches 200.

The feature vector is a vector that is used in a search in a super resolution phase. Thus, it is preferable that the feature vector calculation unit 150 calculates the feature vectors in line with the super resolution phase.

For example, the feature vector calculation unit 150 may use "a brightness vector", which is used in a general super resolution phase, as a feature vector. Alternatively, the feature vector calculation unit 150 may use "a BRIEF (Binary Robust Independent Elementary Feature) feature", which is a binary feature.

The feature vector calculation unit 150 may, in substitution for the patch generation unit 140, receive proper IDs from the proper ID output unit 130 and assign the proper IDs to the registered patches 200. The dashed line illustrated in FIG. 1 illustrates a dataflow connection from the proper ID output unit 130 to the feature vector calculation unit 150 in this case.

The search similarity calculation unit 160 calculates "a similarity calculation method" that classifies the proper IDs assigned to the registered patches 200, based on the feature vectors that the feature vector calculation unit 150 calculates.

"The similarity calculation method" means a method by which the super resolution image generation device 30 calculates similarities between patches of an input image 54 and the registered patches 200, as will be described later. To calculate "the similarity calculation method" means to select "the similarity calculation method" that is used for classifying of proper IDs based on values that are calculated by applying "the similarity calculation methods" to the proper IDs.

The calculation of "the similarity calculation method" in the search similarity calculation unit 160 is, for example, an operation that will be described below.

First, the search similarity calculation unit 160 applies feature vectors to methods to calculate similarities of feature vectors. The search similarity calculation unit 160 classifies the proper IDs based on results of the calculation. The search similarity calculation unit 160 calculates states of classification of the proper IDs. The state of classification is, for example, the mean value of distances between groups of the classified proper IDs or distances between the proper IDs within the groups after classifying. The search similarity calculation unit 160 selects the similarity calculation method that classifies the proper IDs most appropriately (for example, a method that produces long distances between the groups after classifying), based on the calculated states of classification.

"The similarity calculation method" is a method by which the super resolution image generation device 30 calculates the similarities between patches of the input image 54 and the registered patches 200. For example, the similarity calculation method may include a coefficient(s) or a coefficient matrix of a formula that is used in the similarity calculation. Alternatively, the similarity calculation method may include a decision method of similarity, such as a decision method of the difference between patches, or a scale of distance used for decision.

Further, the similarity calculation method may include a plurality of items described above (a coefficient(s), a coefficient matrix, a decision method, or a scale of distance), and may include information other than the above items, which is required for calculation of similarity.

The search similarity calculation unit 160 may calculate a plurality of similarity calculation methods.

The operation of the search similarity calculation unit 160 will be described in more detail with reference to FIG. 3.

Figure 3:
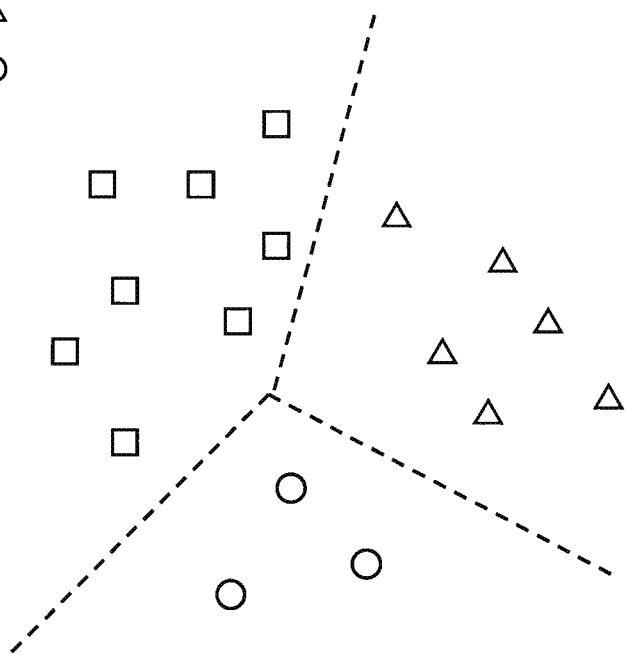
FIG. 3 is a diagram for a description of classification in the first exemplary embodiment.

FIG. 3 is a diagram schematically illustrating a distribution of feature vectors of the registered patches 200 in a feature vector space.

In FIG. 3, the squares illustrate the registered patches 200 which are assigned "ID1s" to "the proper IDs". In a similar manner, the triangles illustrate the registered patches 200 which are assigned "ID2s" to "the proper IDs". The circles illustrate the registered patches 200 which are assigned "ID3s" to "the proper IDs".

The search similarity calculation unit 160 calculates the similarity calculation method in such a way as to appropriately classify the respective proper IDs in the feature vector space.

For example, the dashed lines illustrated in FIG. 3 indicate an example of classifying of the proper IDs. In other words, the search similarity calculation unit 160 calculates the similarity calculation method that achieves classification of the proper IDs to be represented by the dashed lines illustrated in FIG. 3.

Specifically, the search similarity calculation unit 160 should, for example, calculate the similarity calculation method by using the following methods.

(1) Fisher Discriminant
(2) Support Vector Machine (SVM)
(3) Subspace Method
(4) Local Fisher Discriminate Analysis (LFDA)

The search similarity calculation unit 160 may reduce dimensions by using the following methods before carrying out the above-described processing.

(1) Principal Component Analysis (PCA)
(2) Kernel Principal Component Analysis (KPCA)
(3) Locality Preserving Projection (LPP)

Alternatively, the search similarity calculation unit 160 may use Semi-Supervised LFDA (SELF).

The description returns to the description with reference to FIGS. 1 and 2.

The registration unit 170 registers the registered patches 200 each including patches and the like, which will be described below, in the dictionary 20.

(1) "Patches (a high resolution patch 511 and a low resolution patch 521)" generated by the patch generation unit 140
(2) "A proper ID" output by the proper ID output unit 130
(3) "A similarity calculation method" calculated by the search similarity calculation unit 160

Next, an operation of the information processing device 10 will be described with reference to the drawings.

Figure 4:
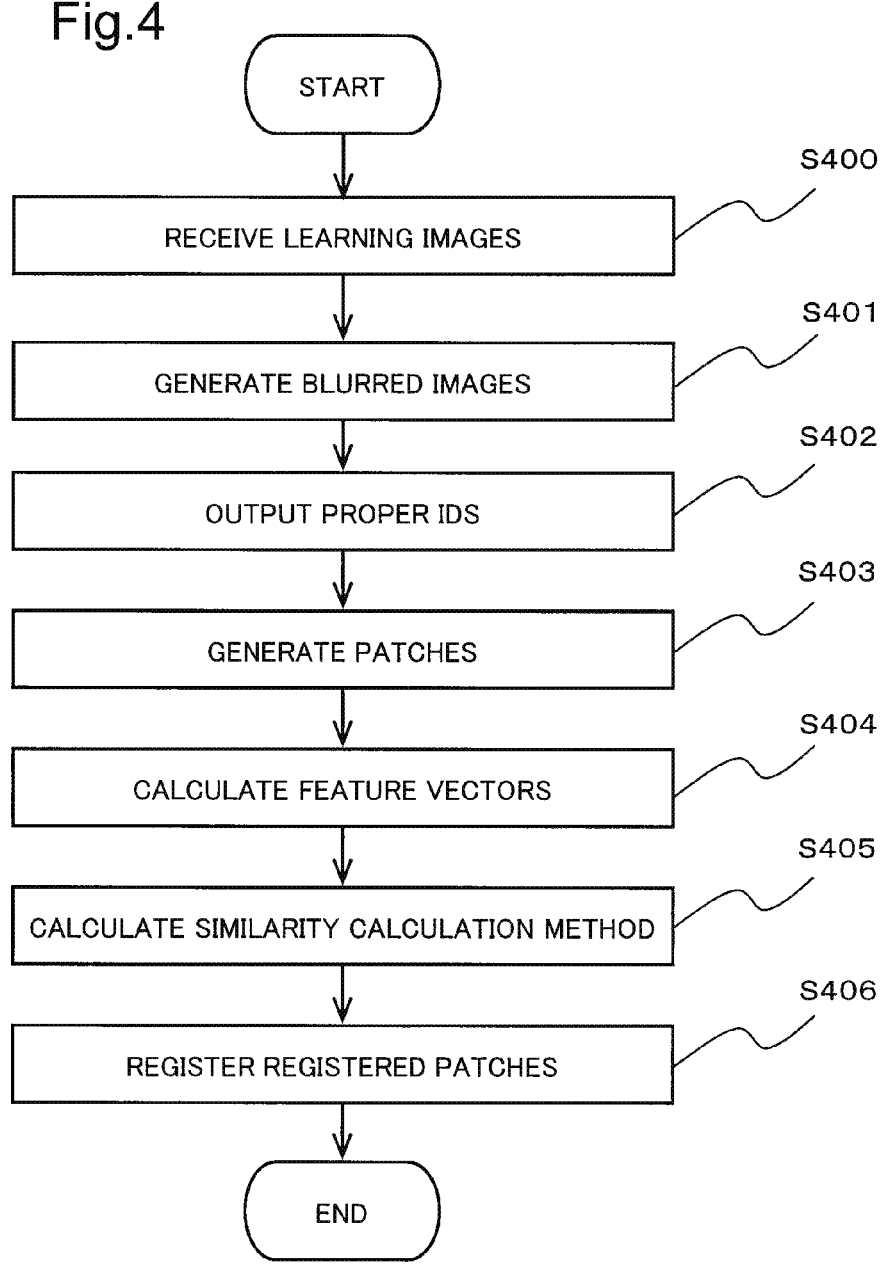
FIG. 4 is a flowchart illustrating an example of an operation of the first exemplary embodiment.

FIG. 4 is a flowchart illustrating an example of an operation of the information processing device 10.

The learning-use high resolution image reception unit 110 of the information processing device 10 receives learning images 51 (step S400).

Next, the blurred image generation unit 120 generates blurred images based on the learning images 51 (step S401).

The proper ID output unit 130 outputs proper IDs (step S402).

The patch generation unit 140 generates patches (high resolution patches 511 and low resolution patches 521) which are included in registered patches 200, based on the learning images 51 and the blurred images 52 (step S403). The patch generation unit 140 may set the proper IDs to the registered patches 200.

The feature vector calculation unit 150 calculates feature vectors based on the low resolution patches 521 included in the registered patches 200 (step S404).

The search similarity calculation unit 160 calculates a similarity calculation method that classifies the proper IDs appropriately, based on the feature vectors (step S405).

The registration unit 170 registers the registered patches 200, each of which includes "the proper ID" output by the proper ID output unit 130, "the patches" generated by the patch generation unit 140, and "the similarity calculation method" calculated by the search similarity calculation unit 160, in the dictionary 20 (step S406).

In this way, the information processing device 10 of the exemplary embodiment registers the registered patches 200, each of which includes the similarity calculation method that is suitable for classification of the proper IDs, in the dictionary 20.

Therefore, the super resolution image generation device 30 is able to use the similarity calculation method when the super resolution image generation device 30 uses the dictionary 20 that the information processing device 10 of the exemplary embodiment registers.

To gain a deeper understanding of the information processing device 10 of the exemplary embodiment, an example of the super resolution image generation device 30, which uses the dictionary 20 that the information processing device 10 of the exemplary embodiment registers, will be described.

A case in which the super resolution image generation device 30 selects a registered patch 200 by using a proper ID will be described below as an example. However, the super resolution image generation device 30 does not have to use a proper ID to select a registered patch 200.

The super resolution image generation device 30 carries out the super resolution phase.

For that purpose, the super resolution image generation device 30 includes, for example, a low resolution image reception unit 310, a patch generation unit 320, a feature vector calculation unit 330, a selection unit 340, and a compositing unit 350.

The low resolution image reception unit 310 receives an input image 54. The low resolution image reception unit 310 acquires the proper ID of the input image 54.

The low resolution image reception unit 310 may acquire the proper p ID in any manner. For example, the low resolution image reception unit 310 may receive the proper ID together with the input image 54. Alternatively, the low resolution image reception unit 310 may acquire the proper ID from a predetermined database based on the input image 54.

Figure 12:
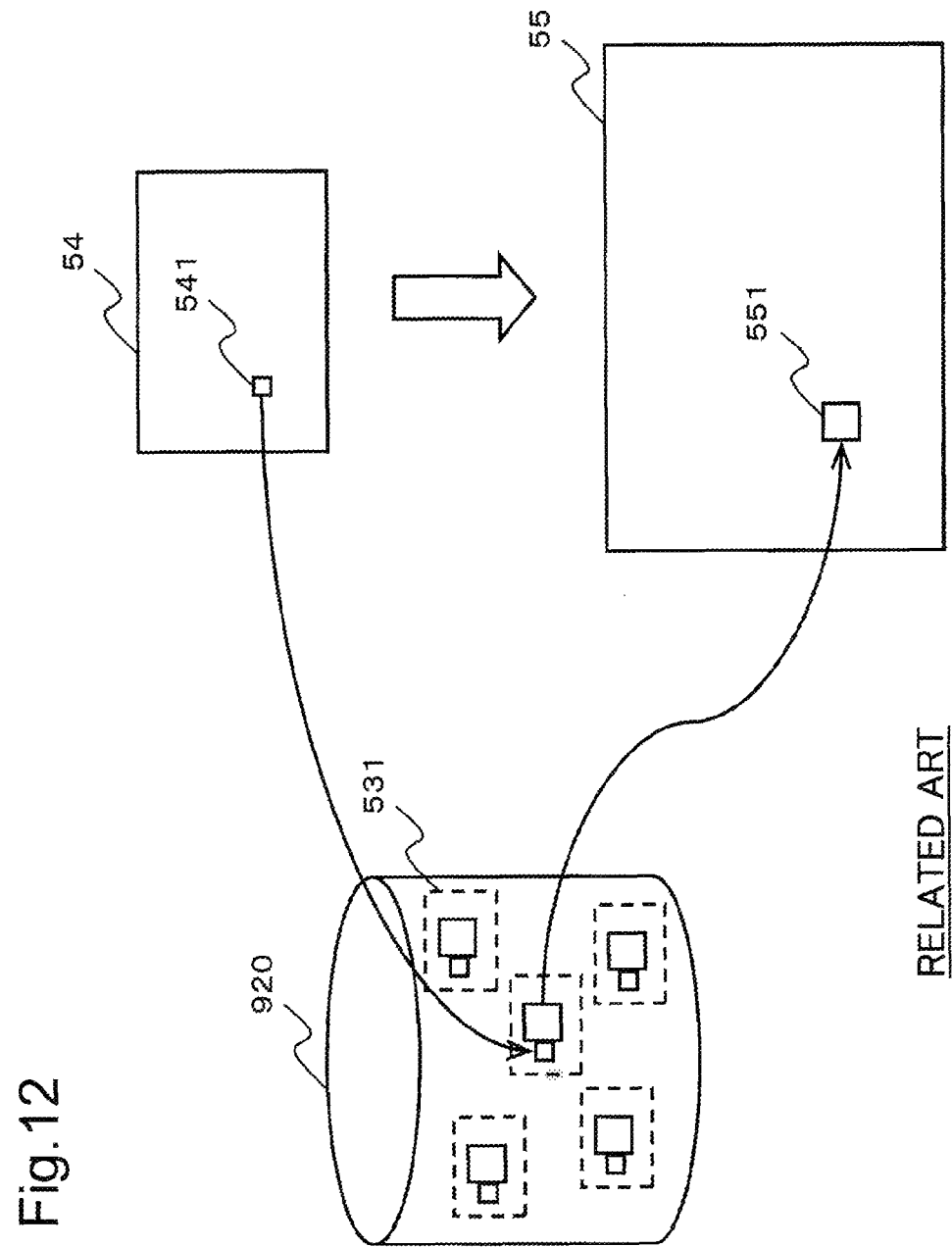
FIG. 12 is a diagram for a description of a super resolution phase that is related to the present invention.

The patch generation unit 320, based on the input image 54, generates patches (for example, an input patch 541, which is illustrated in FIG. 12) for comparison with the registered patches 200 in the dictionary 20.

The patch generation unit 320 may set the proper ID, which the low resolution image reception unit 310 acquires, to the generated patches (the input patches 541).

The feature vector calculation unit 330 calculates feature vectors of the patches generated by the patch generation unit 320.

The selection unit 340 selects a registered patch 200 that corresponds to each patch of the input image 54 and is included in the dictionary 20, based on the feature vector calculated by the feature vector calculation unit 330 and the proper ID.

For example, first, the selection unit 340 selects registered patches 200 that include the same proper ID as the proper ID acquired by the low resolution image reception unit 310. Then, the selection unit 340 selects a similar registered patch 200 from among the selected registered patches 200 based on the feature vector.

As already been described, the selection unit 340 does not have to use the proper ID for selection of a registered patch 200.

The registered patches 200 of the exemplary embodiment include the similarity calculation method that the information processing device 10 has calculated.

Thus, by using the similarity calculation method included in the registered patches 200, the selection unit 340 calculates similarities between the registered patches 200 and a patch of the input image 54, and selects a registered patch 200 that has a close similarity.

A description using a specific example will be made below.

For example, it is assumed that "i" denotes the number of a registered patch 200 and "j" denotes the number of an input patch 541. Further, it is assumed that "$A_i$" denotes the feature vector of the low resolution patch 521 included in the "i-th" registered patch 200. It is also assumed that "$D_i(X, Y)$" denotes the similarity calculation method that is included in the registered patch 200. "$D_i(X, Y)$" is a similarity calculation method that calculates a similarity between vectors X and Y. It is assumed that, the smaller a value calculated by "$D_i(X, Y)$" is, the more similar the registered patch 200 becomes to the input patch 541. It is also assumed that "$B_j$" denotes the feature vector of the "j-th" input patch 541.

Then, the selection unit 340 calculates "$D_i(A_i, B_j)$" as a similarity. The selection unit 340 calculates similarities in the same manner with respect to all registered patches 200 within a range of registered patches 200 for which similarities are calculated. The selection unit 340 selects registered patches 200 in a predetermined range (for example, a predetermined number of registered patches 200 in ascending order of similarities).

The selection unit 340 may select a registered patch 200 or may select, without limited to one registered patch 200, a plurality of registered patches 200.

The compositing unit 350 composites a restored image 55 (a super resolution image) by using the high resolution patches 511 of the registered patches 200 which the selection unit 340 has selected.

As described above, the super resolution image generation device 30 is capable of selecting the registered patches 200 that are used for compositing the restored image 55 (a super resolution image) by using the similarity calculation method that classifies the proper IDs appropriately.

In other words, the information processing device 10 registers the similarity calculation method that classifies the proper IDs of the learning images 51 appropriately and thereby improves the super resolution processing.

The information processing device 10 may associate a blurring method of the blurred image generation unit 120 with a proper ID. In other words, the information processing device 10 may assign a proper ID with respect to each of a plurality of blurring methods which are carried out by the blurred image generation unit 120.

An advantageous effect of the information processing device 10 of the exemplary embodiment will be described.

The information processing device 10 of the exemplary embodiment can achieve an advantageous effect in that the dictionary 20, by which the super resolution image generation device 30 is able to select suitable registered patches 200, is generated.

In other words, the information processing device 10 can achieve an advantageous effect in that, in the super resolution image generation device 30, a blurred image is restored appropriately.

The reason for the advantageous effect is as follows.

The proper ID output unit 130 of the information processing device 10 outputs proper IDs that correspond to learning images 51 (learning-use high resolution images). The search similarity calculation unit 160 of the information processing device 10 calculates a similarity calculation method of registered patches 200 in such a way that the proper IDs assigned to the learning images 51 are classified appropriately. The information processing device 10 registers the registered patches 200 including the similarity calculation method in the dictionary 20.

In consequence, by using the similarity calculation method included in the registered patches 200, which the information processing device 10 of the exemplary embodiment has registered, in the dictionary 20, the super resolution image generation device 30 is capable of selecting registered patches 200 that are suitable for an input image 54 and compositing (restoring) a proper restored image 55.

In other words, the information processing device 10 of the exemplary embodiment is capable of registering, in the dictionary 20, registered patches 200 by which the super resolution image generation device 30 is able to restore a composite image from a blurred image appropriately.

<First Variation>

The configuration of the information processing device 10 is not limited to the configuration described thus far.

The information processing device 10 may have a configuration in which each component is divided into a plurality of components.

Further, the information processing device 10 does not have to be configured with a device. For example, the information processing device 10 may be configured as an information processing system in which a device to generate patches, which includes the patch generation unit 140, and a device to calculate a similarity calculation method, which includes the search similarity calculation unit 160, are interconnected via a network.

The information processing device 10 may store a similarity calculation method, which is calculated based on proper IDs, by including the similarity calculation method in the registered patches 200 that have been registered in the dictionary 20. Thus, the information processing device 10 may store the registered patches 200 in the dictionary 20 first and thereafter calculate the similarity calculation method and add the similarity calculation method to the stored registered patches 200. Alternatively, the information processing device 10 may create or update the similarity calculation method of the registered patches 200 that have been stored in the dictionary 20.

Figure 5:
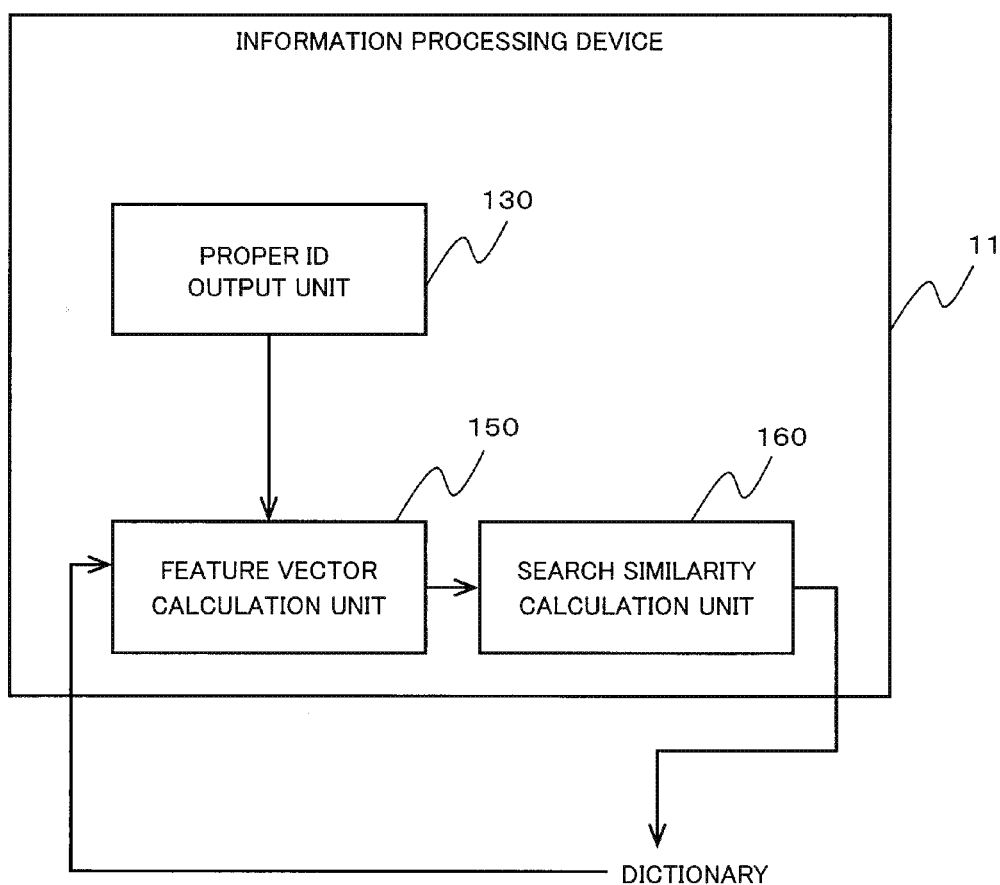
FIG. 5 is a block diagram illustrating an example of a variation of the information processing device of the first exemplary embodiment.

FIG. 5 is a block diagram illustrating an example of a configuration of an information processing device 11, which is a variation of the information processing device 10. In FIG. 5, the same components as in FIG. 1 will be denoted by the same reference numerals and a detailed description thereof will be omitted. Although the information processing device 11 illustrated in FIG. 5 registers or updates a similarity calculation method and a proper ID in a registered patch 200, the information processing device 11 does not register other information included in the registered patch 200 (for example, a high resolution patch 511 and a low resolution patch 521). Thus, in FIG. 5, the registration unit 170 is omitted.

The information processing device 11 includes the proper ID output unit 130, the feature vector calculation unit 150, and the search similarity calculation unit 160.

The proper ID output unit 130 outputs proper IDs that are assigned to the registered patches 200 for which a similarity calculation method is calculated.

The feature vector calculation unit 150 retrieves low resolution patches for which feature vectors are calculated from the dictionary 20 and calculates the feature vectors.

The search similarity calculation unit 160 calculates a similarity calculation method in such a way that the proper IDs are classified appropriately and registers the calculated similarity calculation method in the registered patches 200 in the dictionary 20. The search similarity calculation unit 160 may register the proper IDs in the registered patches 200.

The information processing device 11 may receive the registered patches 200 from a not-illustrated device.

For example, the feature vector calculation unit 150 receives the registered patches 200 from a not-illustrated device and calculates the feature vectors. The proper ID output unit 130 outputs proper IDs. Based on the proper IDs and the feature vectors, the search similarity calculation unit 160 calculates a similarity calculation method. The search similarity calculation unit 160 may register, as the registered patches 200, the patches that the feature vector calculation unit 150 has received, the similarity calculation method, and the proper IDs in the dictionary 20.

The information processing device 11, which is configured in this way, is able to achieve an advantageous effect that is equivalent to the advantageous effect that the information processing device 10 achieves.

The reason for the advantageous effect is as follows.

The reason is that the information processing device is, in the same manner as the information processing device 10, capable of calculating a similarity calculation method for the registered patches 200 in such a way that the proper IDs can be classified appropriately, based on the feature vectors of the registered patches 200 in the dictionary 20, and registering the calculated similarity calculation method in the dictionary 20.

<Second Variation>

The information processing device 10 may be configured in such a way that a plurality of components are combined into a component.

For example, the information processing device 10 may be configured as a computer device that includes a CPU (Central Processing Unit), a ROM (Read Only Memory), and a RAM (Random Access Memory). In addition to the above-described configuration, the information processing device 10 may be configured as a computer device that further includes an Input Output Circuit (IOC) and a Network Interface Circuit (NIC).

Figure 6:
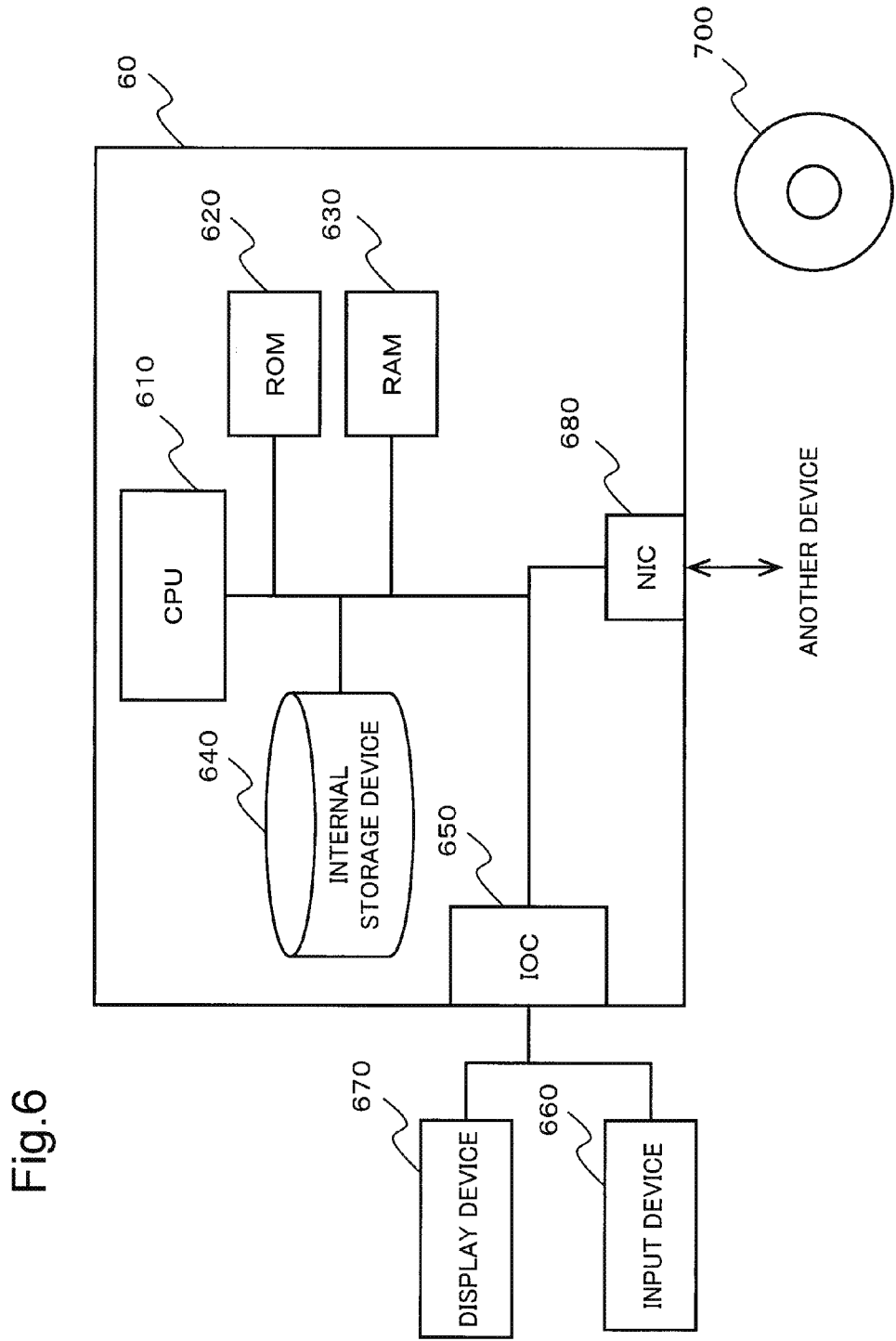
FIG. 6 is a block diagram illustrating an example of a variation of the information processing device of the first exemplary embodiment.

FIG. 6 is a block diagram illustrating an example of a configuration of an information processing device 60, which is a variation of the information processing device 10 of the exemplary embodiment.

The information processing device 60 includes a CPU 610, a ROM 620, a RAM 630, an internal storage device 640, an IOC 650, and an NIC 680, and composes a computer device.

The CPU 610 reads a program from the ROM 620. Based on the read program, the CPU 610 controls the RAM 630, the internal storage device 640, the IOC 650, and the NIC 680. The CPU 610 controls these components and thereby achieves functions of respective components illustrated in FIG. 1. The respective components are the learning-use high resolution image reception unit 110, the blurred image generation unit 120, the proper ID output unit 130, the patch generation unit 140, the feature vector calculation unit 150, the search similarity calculation unit 160, and the registration unit 170. The CPU 610, in achieving functions of the respective components, may use the RAM 630 as a temporary storage for the program.

The CPU 610 may read a program, which is included in a storage medium 700 that stores programs in a computer-readable manner, by using a not-illustrated storage medium reading device, store the program in the RAM 630, and execute the stored program. Alternatively, the CPU 610 may receive a program from a not-illustrated external device via the NIC 680, store the program in the RAM 630, and execute the stored program.

The ROM 620 stores programs that the CPU 610 executes and static data. The ROM 620 is, for example, a P-ROM (Programmable-ROM) or a flash ROM.

The RAM 630 temporarily stores programs that the CPU 610 executes or data. The RAM 630 is, for example, a D-RAM (Dynamic-RAM).

The internal storage device 640 stores programs and data that the information processing device 60 keeps on a long-term. The internal storage device 640 may function as a transitory storage device for the CPU 610. Alternatively, the internal storage device 640 may store programs that the CPU 610 executes. The internal storage device 640 is, for example, a hard disk device, a magneto optical disk, an SSD (Solid State Drive), or a disk array device.

The IOC 650 mediates data between the CPU 610 and an input device 660 and/or a display device 670. The IOC 650 is, for example, an 10 interface card or a USB (Universal Serial Bus) card.

The input device 660 is a device that receives instructions input by an operator of the information processing device 60. The input device 660 is, for example, a keyboard, a mouse, or a touch panel.

The display device 670 is a device that displays information to the operator of the information processing device 60. The display device 670 is, for example, a liquid crystal display.

The NIC 680 relays data exchange with an external device via the network. The NIC 680 is, for example, a LAN (Local Area Network) card.

The information processing device 60, which is configured in such a manner, is able to achieve the same advantageous effect as the information processing device 10.

The reason for the advantageous effect is as follows.

The reason is that the CPU 610 of the information processing device 60 is able to achieve the same functions as the information processing device 10 based on programs.

(Second Exemplary Embodiment)

Figure 7:
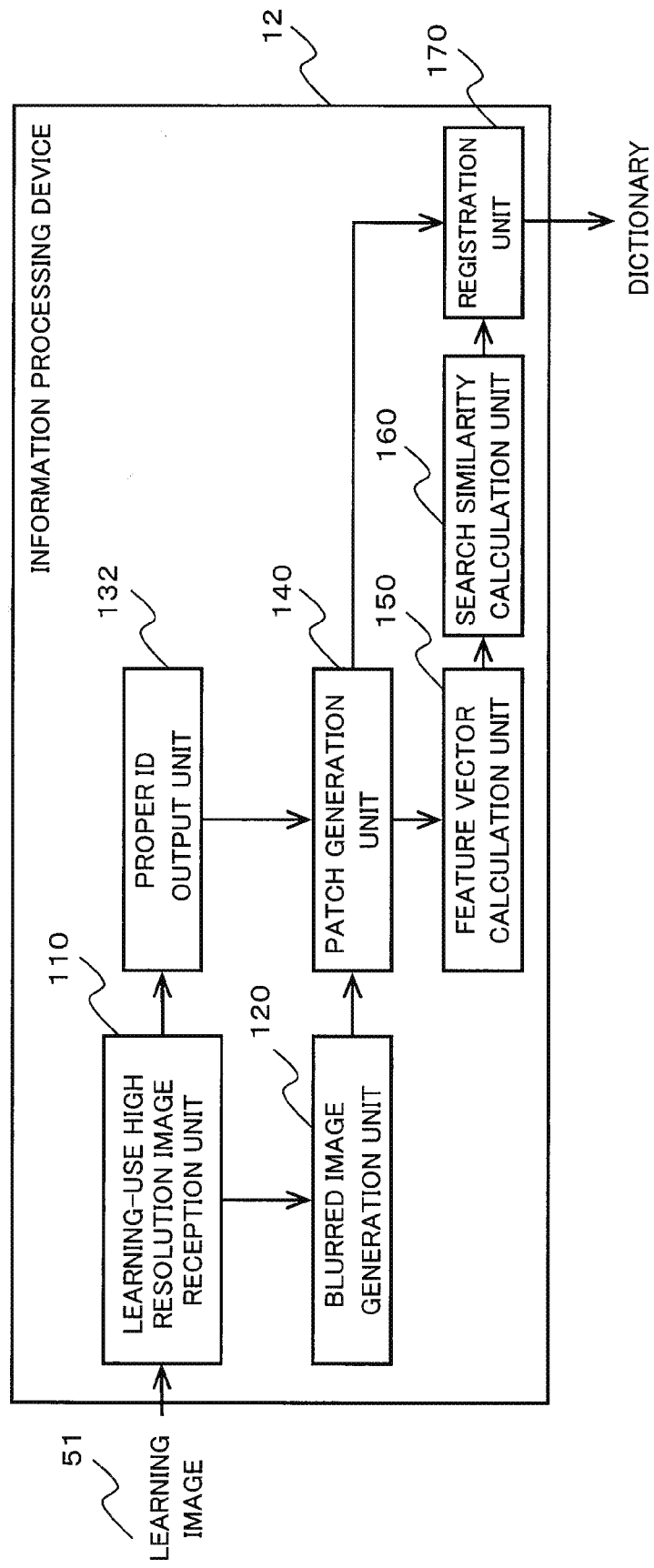
FIG. 7 is a block diagram illustrating an example of a configuration of an information processing device of a second exemplary embodiment of the present invention.

FIG. 7 is a block diagram illustrating an example of a configuration of an information processing device 12 according to a second exemplary embodiment.

In FIG. 7, the same reference numerals are assigned to the same components as in FIG. 1. Thus, description of the same configuration and operations as the first exemplary embodiment will be omitted, and components specific to the exemplary embodiment will be described.

The information processing device 12 may be configured with a computer device illustrated in FIG. 6 as with the information processing device 10.

The information processing device 12 includes a proper ID output unit 132 in substitution for the proper ID output unit 130, which is included in the information processing device 10 illustrated in FIG. 1.

The proper ID output unit 132 does not acquire values of proper IDs directly but calculates proper IDs based on learning images 51 that a learning-use high resolution image reception unit 110 receives and outputs the calculated proper IDs. Thus, the proper ID output unit 132 may be considered an embodiment of the proper ID output unit 130. The proper ID output unit 132 operates in the same manner as the proper ID output unit 130 in operations other than the above-described operation.

The proper ID output unit 132 has no particular limitation to a method to calculate proper IDs.

For example, the proper ID output unit 132 may cluster learning images 51 into classes and output identifiers (IDs) of the respective classes as calculated proper IDs.

In the case of character images, the proper ID output unit 132 may calculate gradient direction histograms of the learning images 51, cluster the images based on distances between the histograms, and calculate proper IDs based on classes that the images belong to.

Alternatively, the proper ID output unit 132 may, without limited to a gradient histogram, use another histogram, for example, a line element histogram.

In the case of facial images, the proper ID output unit 132 may use a Gabor feature in substitution for a histogram.

Further, the proper ID output unit 132 may carry out clustering by using either the wholes of the learning images 51 or predetermined regions in the learning images 51.

As described above, the information processing device 12 calculates the proper IDs based on the learning images 51. Based on the calculated proper IDs, the information processing device 12 calculates a similarity calculation method, and registers the calculated similarity calculation method in registered patches 200 in a dictionary 20.

The information processing device 12 calculates the proper IDs based on the learning images 51. In other words, the proper ID is equivalent to classification of the learning images 51.

Thus, based on the calculated proper IDs, the information processing device 12 may select blurring methods used in a blurred image generation unit 120. In other words, the information processing device 12 may associate classification of the proper IDs of the learning images 51, which the proper ID output unit 132 calculates, with blurring methods carried out by the blurred image generation unit 120.

The information processing device 12 according to the second exemplary embodiment, which is configured in such a manner, is able to achieve an advantageous effect in reducing operations by a user in addition to the advantageous effect of the first exemplary embodiment.

The reason for the advantageous effect is as follows.

The reason is that the proper ID output unit 132 of the information processing device 12 calculates the proper IDs based on the learning images 51. Thus, an operator of the information processing device 12 does not have to instruct input of proper IDs or an acquisition position of the proper IDs.

(Third Exemplary Embodiment)

Figure 8:
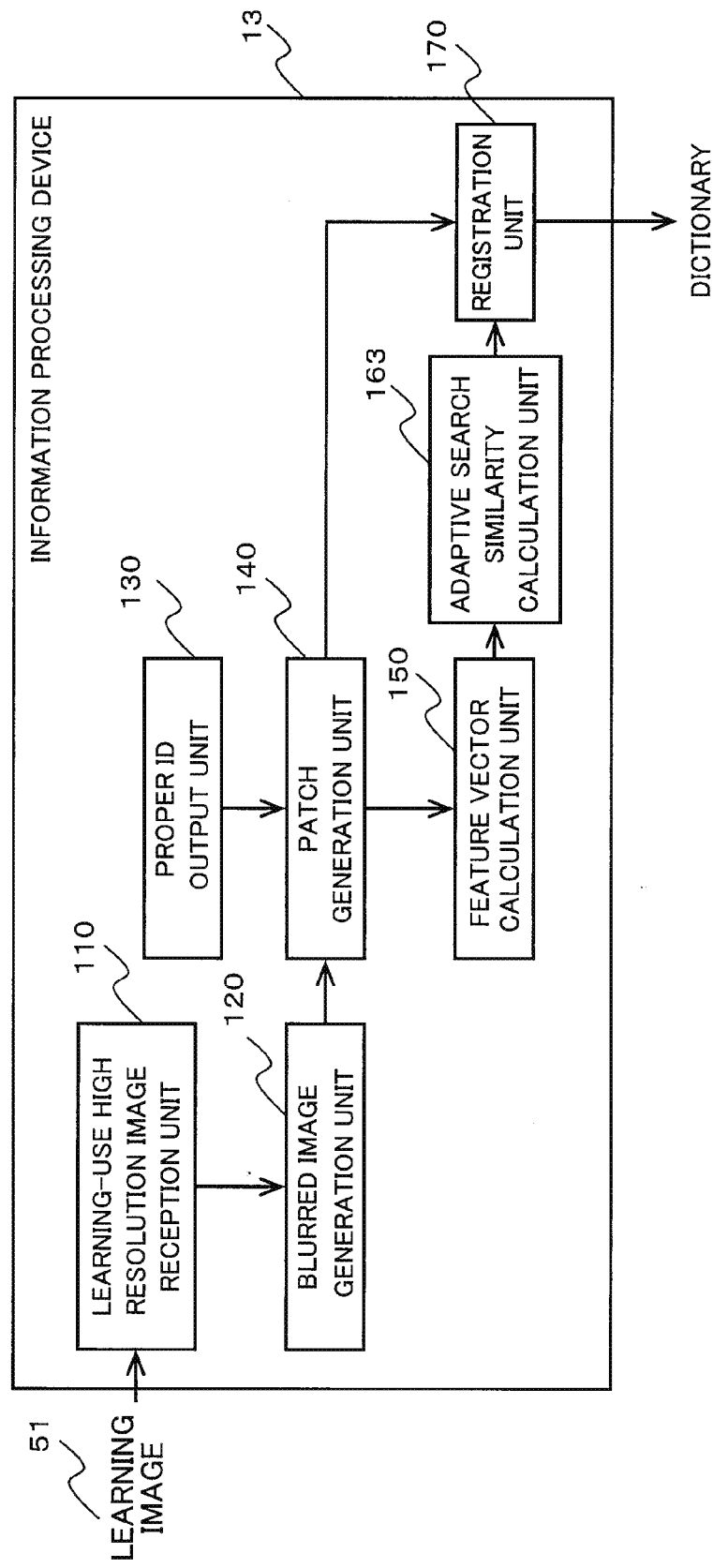
FIG. 8 is a block diagram illustrating an example of a configuration of an information processing device of a third exemplary embodiment of the present invention.

FIG. 8 is a block diagram illustrating an example of a configuration of an information processing device 13 according to a third exemplary embodiment.

In FIG. 8, the same components as in FIG. 1 will be denoted by the same reference numerals and a detailed description thereof will be omitted.

The information processing device 13 may be configured with a computer device illustrated in FIG. 6 as with the information processing device 10.

The information processing device 13 differs from the first exemplary embodiment in including an adaptive search similarity calculation unit 163 in substitution for the search similarity calculation unit 160. Thus, the adaptive search similarity calculation unit 163 will be described below in detail.

The adaptive search similarity calculation unit 163 calculates a similarity calculation method, which is to be calculated, in registered patches 200 based on not the wholes of learning images 51 but predetermined local regions thereof. The adaptive search similarity calculation unit 163 operates in the same manner as the search similarity calculation unit 160 in operations other than the above-described operation. Thus, the adaptive search similarity calculation unit 163 is an embodiment of the search similarity calculation unit 160.

"The predetermined region" in the above description will be described below.

"The predetermined region" in the exemplary embodiment is a region that corresponds to a subject (object) included in a learning image 51.

For example, when the learning image 51 is an image of the face of a human, the adaptive search similarity calculation unit 163 treats a region including a portion of the face (the eyes, the nose, the mouth, or the like), as a local region. By using patches in predetermined regions (for example, regions of the eyes) in the learning images 51, the adaptive search similarity calculation unit 163 calculates a similarity calculation method that classifies proper IDs appropriately.

Alternatively, when the learning image 51 is an image including numerals or characters, the adaptive search similarity calculation unit 163 may treat a character portion or a numeral portion included in a predetermined region as the local region.

The information processing device 13 configured in such a manner is able to achieve an advantageous effect in that it is possible to register, in the dictionary 20, the registered patches 200 that make it possible to create a super resolution image with a higher accuracy, compared with the first exemplary embodiment.

In other words, the information processing device 13 is able to achieve a higher-accuracy restoration.

The reason for the advantageous effect is as follows.

The information processing device 13 calculates a similarity calculation method of the registered patches 200 based on images in predetermined portions (regions) in the learning images 51, that is, images of similar objects or closely resembling objects included in the learning images 51.

Thus, by using a similarity calculation method by which predetermined portions can be classified appropriately, the information processing device 13 is able to calculate similarities that are suitable for the regions.

In other words, based on a similarity calculation method that is suitable for each portion of the dictionary 20, which the information processing device 13 has created, the super resolution image generation device 30 is capable of selecting the registered patches 200. As a result, the super resolution image generation device 30 is capable of compositing (restoring) a super resolution image with a higher accuracy.

As described above, the information processing device 13 is capable of creating the dictionary 20 by which the super resolution image generation device 30 is able to restore a blurred image appropriately.

(Fourth Exemplary Embodiment)

There is a case in which a super resolution image is used for image recognition.

Figure 9:
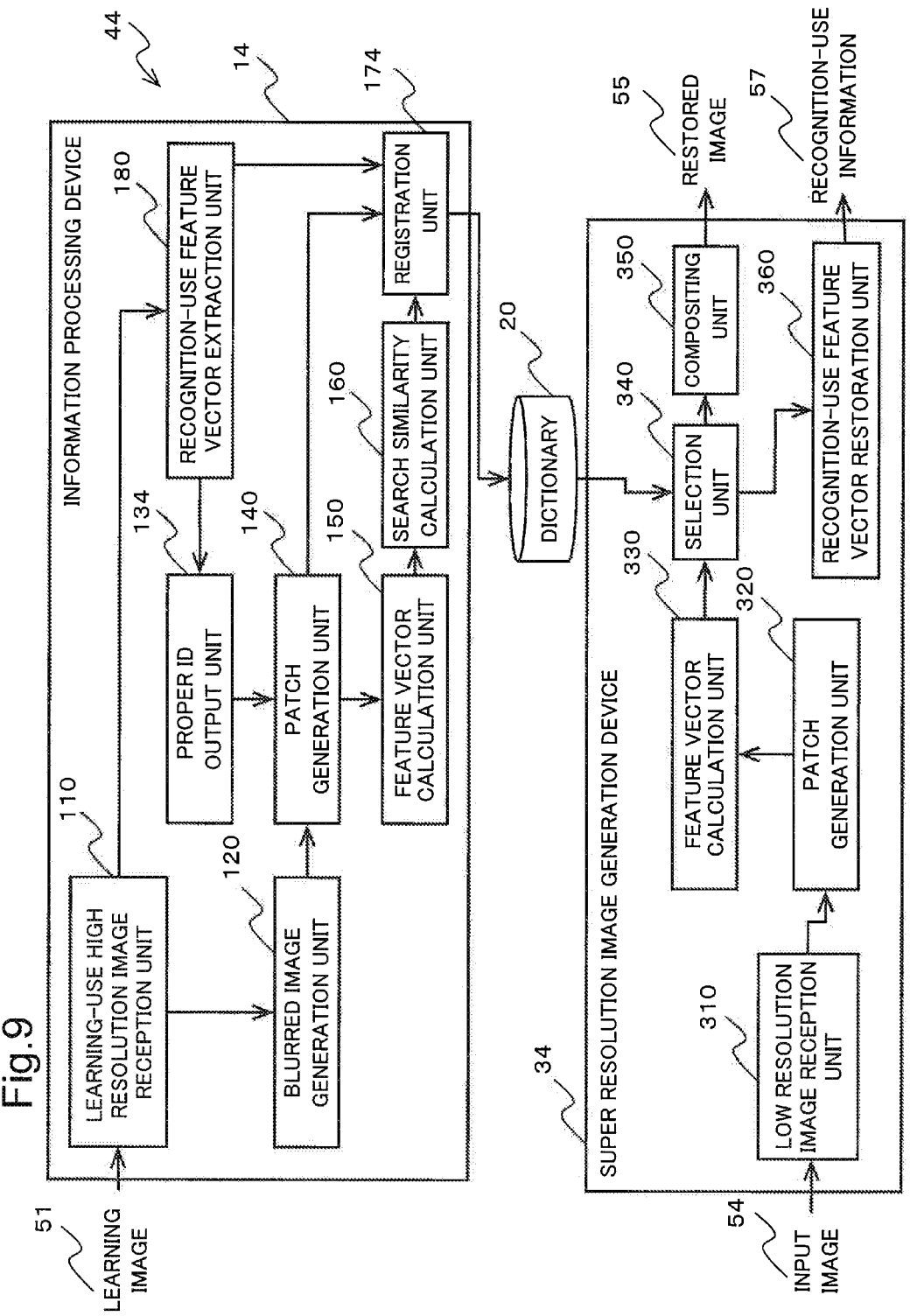
FIG. 9 is a block diagram illustrating an example of a configuration of an information processing device of a fourth exemplary embodiment of the present invention.
Figure 10:
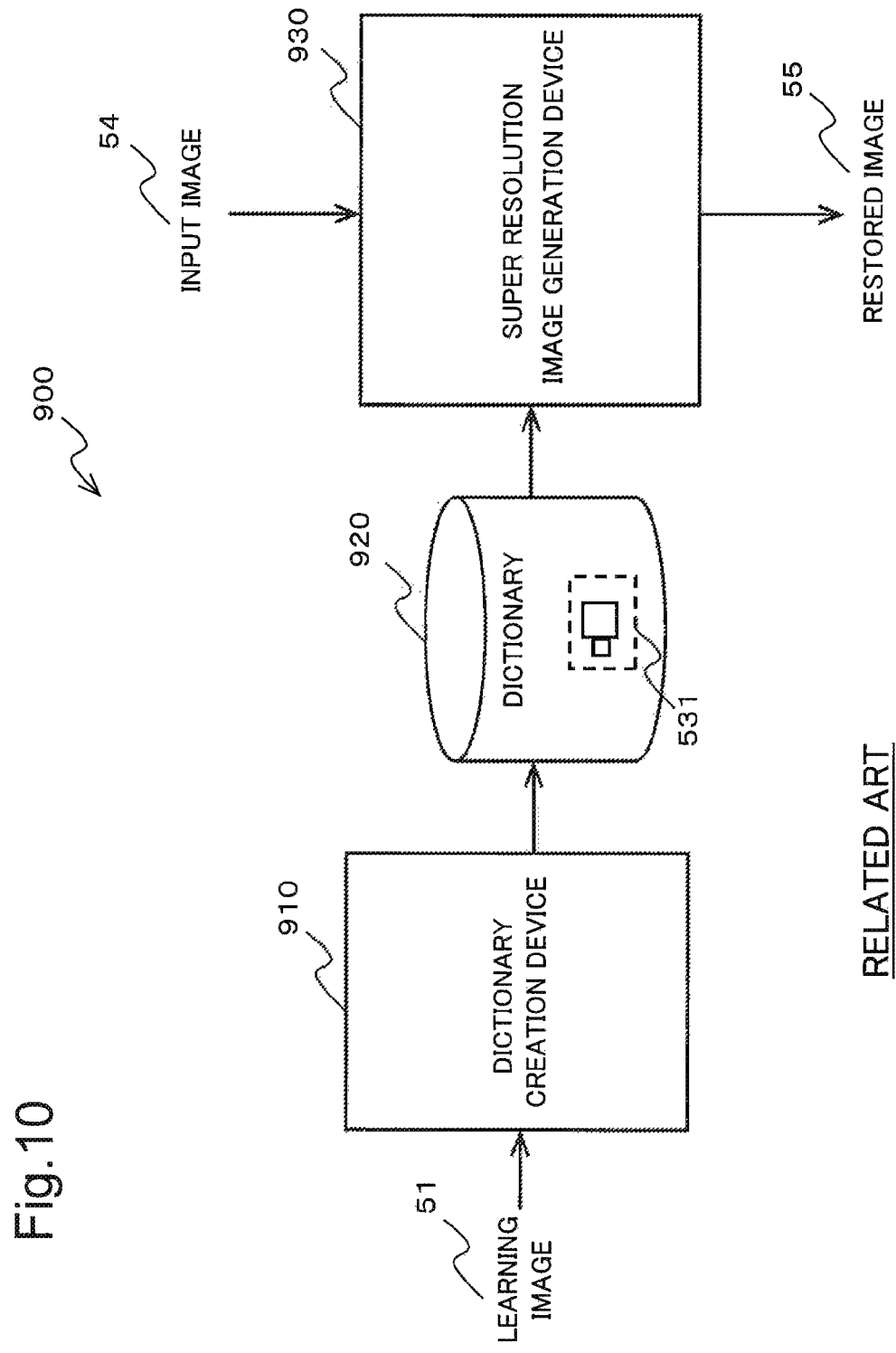
FIG. 10 is a block diagram for a description of an example of a configuration of a super resolution system that is related to the present invention.

FIG. 9 is a block diagram illustrating an example of a configuration of a super resolution system 44 that includes an information processing device 14 according to a fourth exemplary embodiment. In FIG. 9, the same components as in FIG. 1 will be denoted by the same reference numerals and a detailed description thereof will be omitted.

The super resolution system 44 includes the information processing device 14, a dictionary 20, and a super resolution image generation device 34. The super resolution system 44 is a system that is suitable for not only compositing of a super resolution image but also image recognition processing.

The information processing device 14 includes a recognition-use feature vector extraction unit 180 in addition to the configuration of the information processing device 10 of the first exemplary embodiment. In relation to the recognition-use feature vector extraction unit 180, the information processing device 14 differs from the information processing device 10 in including a proper ID output unit 134 and a registration unit 174 in substitution for the proper ID output unit 130 and the registration unit 170.

The super resolution image generation device 34 includes a recognition-use feature vector restoration unit 360 in addition to the configuration of the super resolution image generation device 30 of the first exemplary embodiment.

Since the other configuration is the same as the first exemplary embodiment, features that are specific to the exemplary embodiment will be described.

The information processing device 14 may be configured with a computer device that is illustrated in FIG. 6 as with the information processing device 10.

The recognition-use feature vector extraction unit 180, based on learning images 51, extracts recognition-use feature vectors that are used for image recognition processing. The recognition-use feature vector extraction unit 180 transmits the extracted recognition-use feature vectors to the proper ID output unit 134 and the registration unit 174.

Based on the recognition-use feature vectors, the proper ID output unit 134 calculates proper IDs. In other words, the proper IDs that the information processing device 14 calculates are proper IDs that are suitable for image recognition.

Based on the proper IDs that are suitable for image recognition, the search similarity calculation unit 160 calculates a similarity calculation method.

In other words, the information processing device 14 is capable of calculating a similarity calculation method that is suitable for image recognition.

The registration unit 174 registers the recognition-use feature vectors in the dictionary 20 in addition to registration of registered patches 200 that include the similarity calculation method.

The recognition-use feature vector restoration unit 360 restores, from the dictionary 20, recognition-use feature vectors that are associated with registered patches 200 that a selection unit 340 selects. The recognition-use feature vector restoration unit 360 transmits the restored feature vectors to a not-illustrated image recognition device as recognition-use information 57.

The not-illustrated image recognition device carries out image recognition that is different from super resolution image processing carried out by a super resolution image generation device 34. However, the feature vectors that are used for image recognition are feature vectors that are associated with the registered patches 200 that are selected for a super resolution image. Thus, the image recognition device is able to improve accuracy in image recognition of a super resolution image based on the recognition-use information 57.

The proper ID output unit 134 may output proper IDs as with the proper ID output unit 130 of the first exemplary embodiment.

As described above, the information processing device 14 described in the fourth exemplary embodiment is able to achieve an advantageous effect in that it is possible to carry out image recognition appropriately in addition to the advantageous effects of the first exemplary embodiment.

The reason for the advantageous effect is as follows.

The information processing device 14 extracts feature vectors that are used for image recognition based on the learning images 51, and registers the extracted feature vectors in the dictionary 20. The information processing device 14 also calculates a similarity calculation method based on proper IDs that are suitable for image recognition.

The super resolution image generation device 34 is capable of transmitting feature vectors that are used for image recognition to an image recognition device as recognition-use information 57 in addition to compositing a super resolution image.

Thus, the image recognition device is able to improve accuracy of recognition in image recognition of a super resolution image by using the feature vectors.

The selection unit 340 of the super resolution image generation device 34 is capable of selecting registered patches 200 based on a similarity calculation method that is suitable for image recognition. In other words, a restored image 55 (a super resolution image) that the super resolution image generation device 34 composites is an image that is suitable for image recognition.

Thus, since the image recognition device is able to carry out image recognition based on a super resolution image that is suitable for image recognition, the image recognition device is able to improve accuracy in image recognition.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2013-079338, filed on Apr. 5, 2013, the disclosure of which is incorporated herein in its entirety by reference.

The whole or part of the exemplary embodiments disclosed above can be described as, but not limited to, the following supplementary notes.

(Supplementary Note 1)
An information processing device includes:
a proper identifier output unit which outputs proper identifiers for identifying learning images;
a feature vector calculation unit which calculates feature vectors of at least a part of patches included in registered patches that are registered in a dictionary for compositing a restored image; and
a search similarity calculation unit which calculates a similarity calculation method that classifies the proper identifiers to be given to the registered patches based on the feature vectors.

(Supplementary Note 2)
The information processing device according to supplementary note 1, further includes:
a learning-use high resolution image reception unit which receives the learning images;
a blurred image generation unit which generates blurred images of the learning images;
a patch generation unit which generates patches included in the registered patches based on the learning images and the blurred images; and
a registration unit which registers the registered patches in the dictionary with including the similarity calculation method.

(Supplementary Note 3)
The information processing device according to supplementary note 2, wherein
the feature vector calculation unit or the patch generation unit gives the proper identifiers to the registered patches.

(Supplementary Note 4)
The information processing device according to supplementary note 2 or 3, wherein
the proper identifier output unit calculates the proper identifiers based on the learning images.

(Supplementary Note 5)
The information processing device according to any one of supplementary notes 2 to 4, wherein
the search similarity calculation unit calculates the similarity calculation method with respect to predetermined regions in the learning images.

(Supplementary Note 6)
The information processing device according to any one of supplementary notes 2 to 5, wherein
the blurred image generation unit selects a blurring method to generate blurred images based on the proper identifiers.

(Supplementary Note 7)
The information processing device according to any one of supplementary notes 1 to 6, further includes:
a recognition-use feature vector extraction unit which extracts feature vectors that are used for image recognition from learning images.

(Supplementary note 8)
An image processing method, includes:
outputting proper identifiers for identifying learning images;
calculating feature vectors of at least a part of patches included in registered patches that are registered in a dictionary for compositing a restored image; and
calculating a similarity calculation method that classifies the proper identifiers to be given to the registered patches based on the feature vectors.

(Supplementary Note 9)
The image processing method according to supplementary note 8, further includes:
receiving the learning images;
generating blurred images of the learning images;
generating patches included in the registered patches based on the learning images and the blurred images; and
registering the registered patches in the dictionary with including the similarity calculation method.

(Supplementary Note 10)
The image processing method according to supplementary note 8 or 9, further includes:
giving the proper identifiers to the registered patches.

(Supplementary Note 11)
The image processing method according to any one of supplementary notes 8 to 10, further includes:
calculating the proper identifiers based on the learning images.

(Supplementary Note 12)
The image processing method according to any one of supplementary notes 8 to 11, further includes:
calculating the similarity calculation method with respect to predetermined regions in the learning images.

(Supplementary Note 13)
The image processing method according to any one of supplementary notes 8 to 12, further includes:
selecting a blurring method to generate blurred images based on the proper identifiers.

(Supplementary Note 14)
The image processing method according to any one of supplementary notes 8 to 13, further includes:

extracting feature vectors that are used for image recognition from learning images.

(Supplementary Note 15)

A computer-readable recording medium embodying a program, the program causing a computer device to perform a method, the method comprising:

outputting proper identifiers for identifying learning images;

calculating feature vectors of at least a part of patches included in registered patches that are registered in a dictionary for compositing a restored image; and calculating a similarity calculation method that classifies the proper identifiers to be given to the registered patches based on the feature vectors.

(Supplementary Note 16)

The computer-readable recording medium embodying the program causing the computer device to perform the method according to supplementary note 15, the method further comprising:

receiving the learning images;

generating blurred images of the learning images;

generating patches included in the registered patches based on the learning images and the blurred images; and registering the registered patches in the dictionary with including the similarity calculation method.

(Supplementary Note 17)

The computer-readable recording medium embodying the program causing the computer device to perform the method according to supplementary note 15 or 16, the method further comprising:

giving the proper identifiers to the registered patches.

(Supplementary Note 18)

The computer-readable recording medium embodying the program according to the program causing the computer device to perform the method according to supplementary notes 15 to 17, the method further comprising:

calculating the proper identifiers based on the learning images.

(Supplementary Note 19)

The computer-readable recording medium embodying the program causing the computer device to perform the method according to supplementary notes 15 to 18, the method further comprising:

calculating the similarity calculation method with respect to predetermined regions in the learning images.

(Supplementary Note 20)

The computer-readable recording medium embodying the program causing the computer device to perform the method according to supplementary notes 15 to 19, the method further comprising:

selecting a blurring method to generate blurred images based on the proper identifiers.

(Supplementary Note 21)

The computer-readable recording medium embodying the program causing the computer device to perform the method according to supplementary notes 15 to 20, the method further comprising:

extracting feature vectors that are used for image recognition from learning images.

REFERENCE SINGS LIST

10 Information processing device
11 Information processing device
12 Information processing device
13 Information processing device
14 Information processing device
20 Dictionary
30 Super resolution image generation device
34 Super resolution image generation device
40 Super resolution system
44 Super resolution system
51 Learning image
52 Blurred image
54 Input image
55 Restored image
57 Recognition-use information
60 Information processing device
110 Learning-use high resolution image reception unit
120 Blurred image generation unit
130 Proper ID output unit
132 Proper ID output unit
134 Proper ID output unit
140 Patch generation unit
150 Feature vector calculation unit
160 Search similarity calculation unit
163 Adaptive search similarity calculation unit
170 Registration unit
174 Registration unit
180 Recognition-use feature vector extraction unit
200 Registered patch
310 Low resolution image reception unit
320 Patch generation unit
330 Feature vector calculation unit
340 Selection unit
350 Compositing unit
360 Recognition-use feature vector restoration unit
511 High resolution patch
521 Low resolution patch
531 Patch pair
541 Input patch
551 Restoration patch
610 CPU
620 ROM
630 RAM
640 Internal storage device
650 IOC
660 Input device
670 Display device
680 NIC
700 Storage medium
900 Super resolution system
910 Dictionary creation device
920 Dictionary
930 Super resolution image generation device

The invention claimed is:

1. An information processing device, comprising:
a central processing unit (CPU); and
a memory connected to the CPU;
wherein the CPU reads a program from the memory and achieves functions of:
outputting proper identifiers for identifying learning images;
calculating feature vectors of at least a part of patches included in registered patches that are registered in a dictionary for compositing a restored image; and
calculating a similarity calculation method that calculates similarities between patches for classifying the proper identifiers to be given to the registered patches based on the feature vectors.

2. The information processing device according to claim 1, wherein the CPU reads the program from the memory and further achieves functions of:
receiving the learning images;

generating blurred images of the learning images;
generating patches included in the registered patches based on the learning images and the blurred images; and
registering the registered patches in the dictionary with including the similarity calculation method.

3. The information processing device according to claim 2, wherein
the calculating the feature vectors or the generating the patches gives the proper identifiers to the registered patches.

4. The information processing device according to claim 2, wherein
the outputting proper identifiers includes calculating the proper identifiers based on the learning images.

5. The information processing device according to claim 2, wherein
the similarity calculation method is calculated with respect to predetermined regions in the learning images.

6. The information processing device according to claim 2, wherein
the generating the blurred images includes selecting a blurring method to generate blurred images based on the proper identifiers.

7. The information processing device according to claim 1, wherein the CPU reads the program from the memory and further achieves functions of:
extracting feature vectors that are used for image recognition from learning images.

8. An image processing method, comprising: outputting proper identifiers for identifying learning images;
calculating feature vectors of at least a part of patches included in registered patches that are registered in a dictionary for compositing a restored image; and
calculating a similarity calculation method that calculates similarities between patches for classifying the proper identifiers to be given to the registered patches based on the feature vectors.

9. The image processing method according to claim 8, further comprising:
receiving the learning images;
generating blurred images of the learning images;
generating patches included in the registered patches based on the learning images and the blurred images; and
registering the registered patches in the dictionary with including the similarity calculation method.

10. The image processing method according to claim 8, further comprising:
giving the proper identifiers to the registered patches.

11. The image processing method according to claim 8, further comprising:
calculating the proper identifiers based on the learning images.

12. The image processing method according to claim 8, further comprising:
calculating the similarity calculation method with respect to predetermined regions in the learning images.

13. The image processing method according to claim 8, further comprising:
selecting a blurring method to generate blurred images based on the proper identifiers.

14. The image processing method according to claim 8, further comprising:
extracting feature vectors that are used for image recognition from learning images.

15. A non-transitory computer-readable recording medium embodying a program, the program causing a computer device to perform a method, the method comprising:
outputting proper identifiers for identifying learning images;
calculating feature vectors of at least a part of patches included in registered patches that are registered in a dictionary for compositing a restored image; and
calculating a similarity calculation method that calculates similarities between patches for classifying the proper identifiers to be given to the registered patches based on the feature vectors.

16. The non-transitory computer-readable recording medium embodying the program causing the computer device to perform the method according to claim 15, the method further comprising:
receiving the learning images;
generating blurred images of the learning images;
generating patches included in the registered patches based on the learning images and the blurred images; and
registering the registered patches in the dictionary with including the similarity calculation method.

17. The non-transitory computer-readable recording medium embodying the program causing the computer device to perform the method according to claim 15, the method further comprising:
giving the proper identifiers to the registered patches.

18. The non-transitory computer-readable recording medium embodying the program causing the computer device to perform the method according to claim 15, the method further comprising:
calculating the proper identifiers based on the learning images.

19. The non-transitory computer-readable recording medium embodying the program causing the computer device to perform the method according to claim 15, the method further comprising:
calculating the similarity calculation method with respect to predetermined regions in the learning images.

20. The non-transitory computer-readable recording medium embodying the program causing the computer device to perform the method according to claim 15, the method further comprising:
selecting a blurring method to generate blurred images based on the proper identifiers.

21. The non-transitory computer-readable recording medium embodying the program causing the computer device to perform the method according to claim 15, the method further comprising:
extracting feature vectors that are used for image recognition from learning images.

22. An information processing device, comprising: proper identifier output means for outputting proper identifiers for identifying learning images;
feature vector calculation means for calculating feature vectors of at least a part of patches included in registered patches that are registered in a dictionary for compositing a restored image; and
search similarity calculation means for calculating similarities between patches for classifying a similarity calculation method that classifies the proper identifiers to be given to the registered patches based on the feature vectors.

* * * * *